US 11,413,946 B2

(12) United States Patent
Absenger et al.

(10) Patent No.: US 11,413,946 B2
(45) Date of Patent: Aug. 16, 2022

(54) ELECTRIC DRIVE WITH COOLING (71) Applicant: GKN Automotive Limited, Birmingham (GB)

(72) Inventors: Marc Absenger, Wuppertal (DE); Waldemar Rupp, Hürth (DE); Mario Besgen, Cologne (DE); Dominic Eichholz, Rheinbach (DE); Tobias Sander, Cologne (DE); Hans-Joachim Schmeink, Lohmar (DE); Colin Zaers, Königswinter (DE)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/281,287

(22) PCT Filed: Oct. 4, 2018

(86) PCT No.: PCT/EP2018/077011
§ 371 (c)(1),
(2) Date: Mar. 30, 2021

(87) PCT Pub. No.: WO2020/069744
PCT Pub. Date: Apr. 9, 2020

(65) Prior Publication Data
US 2021/0394600 A1 Dec. 23, 2021

(51) Int. Cl.
*B60K 1/00* (2006.01)
*F16H 57/021* (2012.01)
(Continued)

(52) U.S. Cl.
CPC ............. *B60K 1/00* (2013.01); *F16H 57/021* (2013.01); *F16H 57/037* (2013.01);
(Continued)

(58) Field of Classification Search
None
See application file for complete search history.

(56) References Cited

U.S. PATENT DOCUMENTS 7,152,711 B2 * 12/2006 Finocchio .............. F01M 9/108
184/6.12
7,884,511 B2 * 2/2011 Mogi ..................... B60K 17/12
310/63
(Continued)

FOREIGN PATENT DOCUMENTS

CN 103925338 A * 7/2014 ............... F16H 1/32
CN 204271815 U 4/2015
(Continued)

OTHER PUBLICATIONS

Trailer Body Builders, "Chelsea Products Wet Spline technology addresses spline fretting in PTO's, pumps", Jan. 1, 2011 (Year: 2011).*
(Continued)

*Primary Examiner* — Dirk Wright
(74) *Attorney, Agent, or Firm* — Bejin Bieneman PLC (57) ABSTRACT

An electric drive can comprise a housing assembly; an electric machine with a hollow shaft; a planetary gearing; and a power distribution unit having an input part and two output parts, the input part being connected to the planet carrier, one of the output parts being connected to an intermediate shaft extending through the hollow shaft; wherein the housing assembly comprises a motor-sided first housing part, a gearing-sided second housing part, and an intermediate housing part disposed therebetween, wherein the intermediate housing part includes, integrally formed, an intermediate wall, a motor-side jacket portion and a gearing-side jacket portion, wherein a sealed cavity for a coolant flowing therethrough is formed between an outer face of the
(Continued)

motor-side jacket portion and the inner face of the first gearing part.

17 Claims, 4 Drawing Sheets

(51) Int. Cl.
*F16H 57/037* (2012.01)
*F16H 57/04* (2010.01)
*H02K 5/20* (2006.01)
*H02K 7/116* (2006.01)
*H02K 9/19* (2006.01)
*F16H 57/02* (2012.01)

(52) U.S. Cl.
CPC ....... *F16H 57/045* (2013.01); *F16H 57/0412* (2013.01); *H02K 5/20* (2013.01); *H02K 7/116* (2013.01); *H02K 9/19* (2013.01); *B60K 2001/001* (2013.01); *B60K 2001/006* (2013.01); *F16H 57/0471* (2013.01); *F16H 2057/02034* (2013.01); *F16H 2057/02052* (2013.01)

(56) References Cited

U.S. PATENT DOCUMENTS

| | | | |
|---|---|---|---|
| 8,049,384 B2 * | 11/2011 | Wilton | B60K 1/00 |
| | | | 310/83 |
| 9,297,426 B2 * | 3/2016 | Graves | F16D 25/0638 |
| 9,719,584 B1 * | 8/2017 | Duan | F16H 37/0813 |
| 10,253,848 B2 * | 4/2019 | Hatch | F16H 57/08 |
| 10,525,810 B2 * | 1/2020 | Jegebris | B60K 1/00 |
| 10,644,571 B2 * | 5/2020 | Hatch | H02K 5/20 |
| 2010/0320849 A1 | 12/2010 | Wilton et al. | |

FOREIGN PATENT DOCUMENTS

| | | | | |
|---|---|---|---|---|
| CN | 106246812 A | * | 12/2016 | ......... F16H 1/2854 |
| CN | 107676432 A | * | 2/2018 | ............ F16H 1/32 |
| CN | 108019473 A | * | 5/2018 | |
| CN | 108468755 A | * | 8/2018 | ............ F16H 1/28 |
| DE | 102013225862 A1 | | 6/2015 | |
| WO | 2015058788 A1 | | 4/2015 | |
| WO | 2016066215 A1 | | 5/2016 | |

OTHER PUBLICATIONS

International Search Report and Written Opinion for PCT/EP2018/077011 dated Dec. 10, 2018 (17 pages; with English translation).

* cited by examiner

ELECTRIC DRIVE WITH COOLING

CROSS-REFERENCE TO RELATED APPLICATIONS

This application is a national stage of, and claims priority to, Patent Cooperation Treaty Application No. PCT/EP2018/077011, filed on Oct. 4, 2018, which application is hereby incorporated herein by reference in its entirety.

BACKGROUND

From U.S. Pat. No. 8,049,384 B2, an electric drive with an electric motor, a reduction gearing and a differential gearing is known, which are accommodated in a housing. The housing comprises a first housing part for the motor and a second housing part for the transmission, which are connected to each other by flanged connections. A motor housing is arranged between the first housing part and the electric motor, wherein a cooling jacket is formed between the first housing part and the motor housing, through which coolant flows to remove heat. The motor housing part has a connecting flange which is fixed between the first and second housing part.

From WO 2016 066215 A1 an electric drive with an electric motor, a reduction gearing and a differential gearing is known, which are accommodated in a housing assembly. The electric motor has a hollow shaft with a drive gear that rotatingly drives a transmission shaft of the reduction gearing. An output shaft of the differential gearing extends through the hollow shaft, wherein an annular channel is formed between the hollow shaft and the output shaft. The housing assembly has a lubricant conducting geometry formed to conduct lubricant to the gearing side mouth of the annular channel so that the lubricant can flow through the annular channel to the other end of the electric motor.

From WO 2015058788 A1 is a gearing arrangement for an electric drive. The gearing arrangement comprises a gearing housing, several gears and a lubricant filling. The housing arrangement comprises a first reservoir, which is arranged above the lubricant level and is fillable with lubricant upon rotation of a first gear when the gearing arrangement is driven, and a second reservoir, which is arranged above the lubricant level and is fillable with lubricant upon rotation of the second gear when the gearing arrangement is driven.

A concern in connection with electric drives is the thermal behavior. Both the electric machine and the transmission generate heat, which must be dissipated in order to avoid unacceptably high temperatures and thus ensure a long service life. The electric drive system must be able to withstand various driving conditions over a long term. This applies in particular to driving situations involving low-speed operation with medium or high torque, to driving situations involving particular longer inclines with operating angles typical of off-road vehicles, and to high-speed driving situations in which the vehicle is driven by the combustion engine at maximum speed for a long period of time.

The supply of lubricant to all rotating components of a transmission often proves to be difficult. A high static oil level must be selected to ensure adequate lubrication and cooling of upper mounted shafts and bearings. This results in high splash losses, which in turn leads to increased heat generation due to a relatively large amount of oil in circulation.

SUMMARY

Disclosed herein is an electric drive for driving a motor vehicle with an electric machine and gearing unit to provide reliable cooling and lubrication of rotating drive parts and thus a long service life. The electric drive can serve as the sole drive for the motor vehicle or be provided in addition to an internal combustion engine, wherein the electric drive and the internal combustion engine can drive the motor vehicle separately or together.

An electric drive can comprise: a housing assembly; an electric machine with a motor shaft configured as hollow shaft, which is rotatably drivable about an axis of rotation by the electric machine; a planetary unit with a sun gear, a ring gear, a plurality of planet gears and a planet carrier, wherein the sun gear is rotatably drivable about the axis of rotation by the hollow shaft, and the ring gear is held in the housing assembly in a rotationally fixed manner, a power distribution unit with an input part and two output parts, wherein the input part is connected to the planet carrier and rotates jointly therewith about the axis of rotation, and wherein one of the two output parts is connected to an intermediate shaft which extends through the hollow shaft of the electric machine; wherein the housing assembly comprises a motor-sided first housing part, a gearing-sided second housing part, and an intermediate housing part disposed between the first housing part and the second housing part, wherein the intermediate housing part including an intermediate wall which spatially separates a motor chamber and a gearing chamber, wherein a lubricant is contained in the gearing chamber; wherein the intermediate housing part, formed integrally with the intermediate wall, has a motor-side jacket portion extending from the intermediate wall axially into the outer jacket portion of the first housing part, and a gearing-side jacket portion extending from the intermediate wall axially in direction of the second housing part and is at least indirectly connected thereto, wherein a sealed cavity for a coolant flowing therethrough is formed between the outer face of the motor-side jacket portion and the inner face of the first housing part.

The electric drive is reliably lubricated and cooled in an advantageous manner, and excessively high temperatures are avoided, respectively. The intermediate housing part forms a thermal bridge between the motor section and the gearing section of the electric drive. The intermediate housing part fulfills two functions, namely it forms part of the gearing housing and at the same time part of the motor housing of the electric machine. Thus, the number of interfaces of the housing assembly is low overall, which has a favorable effect on size and weight in addition to favorable thermal behavior. The gearing-side portions of the intermediate housing part absorb heat from the lubricant of the gearing, wherein the heat is transferred to the motor-side jacket portion through the one-piece intermediate housing part. The motor side jacket portion of the intermediate housing part is located within the jacket portion of the first housing part. This allows the jacket portion of the intermediate housing part to very effectively absorb heat generated by the electric motor during operation and transfer it to the motor coolant flowing through the cavity. The cooling of the jacket of the electric machine can be effected with common coolant, such as water or a water-glycol mixture. The cavity formed between the outer jacket and inner jacket can have a meandering or helical pipe structure, for example, so that a large amount of heat can be dissipated. The intermediate housing part can be connected directly to the second housing part, for example by a flange connection, or indirectly via another interposed housing part.

As the intermediate housing part extends axially far into the overlap area with the gearing, the lubricant circulating in the gearing which splashes against the intermediate wall and the gearing-side jacket portion is effectively cooled during operation accordingly. The intermediate housing part at the intermediate wall and the jacket portion absorbs heat from the gearing lubricant coming into contact therewith, which is then dissipated to the motor cooling system via the motor side jacket portion. Overall, an electric drive with particularly effective cooling in a compact design is provided, which accordingly has a long service life. A further advantage is that, when starting the electric drive, the lubricant for the gearing reaches operating temperature very quickly due to contact with the intermediate wall heating up quickly by the electric motor, and with the gearing jacket portion. This has a positive effect on the efficiency of the electric drive. The material used for at least one, several or all of the housing parts can, for example, be metal or an alloy of metallic material, in particular a light metal, such as aluminum die casting, without being limited thereto.

A particularly good heat dissipation from the gearing lubricant is achieved with a preferably large surface of the intermediate housing part on the gearing side. The inner surface of the intermediate housing part, which comes into contact with the gearing lubricant during operation, can form at least 30% of the total inner surface of the housing portion enclosing the gearing chamber in which the lubricant is received, including possibly at least 40%, and possibly also 50% or more of the total inner gearing chamber surface.

According to an embodiment, the gearing-side jacket portion of the intermediate housing part extends axially beyond an engagement plane in which the sun gear is in meshing engagement with the planet gears. This ensures that the lubricant splashing around due to the rotation of the planet carrier and the planet gears rotatably mounted therewith in the toothing plane with the drive gear is thrown against the jacket portion of the cooled intermediate housing part and can quickly and effectively dissipate heat there. In particular, the axial length of the gearing-side jacket portion can be at least 0.15 times, in particular at least 0.2 times, the axial length of the motor-side jacket portion. This means that the gearing-side jacket portion protrudes particularly far over the planet carrier so that the surface over which the jacket portion comes into contact with lubricant and can dissipate heat accordingly is correspondingly large.

According to an embodiment, the intermediate housing part may have an oil catch chamber in an upper half of the housing assembly, which is at least partially in axial overlap with the planet gears. Upon rotation of the planet carrier, lubricant splashing around from the planet gears can be temporarily stored in the oil catch chamber, and guided to remote housing portions via appropriate channels and/or lubricant guides. In this context, the specification of the upper half of the housing refers to the installed condition of the electric motor and describes in particular a half of the housing that is located above a horizontal plane of the housing containing the axis of rotation.

Alternatively or in addition, the second housing part can have an intermediary chamber in a lower half of the housing, which is located above a lowest sump of the gearing chamber. In particular, the intermediary chamber is arranged and configured such that during operation lubricant can enter thereinto and is temporarily stored therein. In this way, the dynamic lubricant level, i.e. the level which is set during operation of the electric drive, is kept particularly low. This keeps the splashing losses during operation low, which in turn leads to reduced heat generation in an advantageous way.

According to an embodiment, the planet carrier and the input part of the power distribution unit can be configured as a common structural unit, which can also be referred to as carrier element. In particular, it is provided that a first end of the carrier element is rotatably mounted at the intermediate housing part by a first bearing, and a second end of the carrier element is rotatably mounted at the second housing part by a second bearing. The carrier element can be formed cage-like, wherein both the planet gears and parts of the power distribution unit can be accommodated therein. According to a first way, the carrier element can be produced in one piece, e.g. by a forming process such as sintering, or in a second way from several separate parts which are subsequently joined together, e.g. by welding or screwing. A gearing-sided fluid channel may be provided, which fluidically connects the oil catch chamber with the remote bearing of the carrier element.

According to an embodiment, the intermediate shaft is rotatably mounted with its distal end by a bearing in a sleeve projection of the first housing part. In particular, a fluid channel is provided which fluidically connects the oil collecting chamber with the sleeve projection of the first housing part for lubricating the bearing. This channel can, for example, be formed by a lubricant line that leads outside the housing to the desired bearing point at the end of the housing. It is provided in particular that the opening assigned to the oil collecting chamber is at a higher level than the opening assigned to the bearing point, so that the lubricant can flow from the oil collecting chamber to the remote opening solely due to gravity.

Both the end-side bearing of the gearing portion and the end-side bearing of the motor portion can be fluidically connected to the oil collecting chamber. This configuration contributes to reliable lubrication of even the remote rotating and sealing parts of the electric drive.

The internal bearing points, i.e. the bearings of the hollow shaft and the carrier element on the intermediate plate, can be arranged with axial overlap to each other, resulting in a compact size. The intermediate plate can comprise a sleeve projection, wherein the shaft bearing for the hollow shaft is provided in an inner bearing seat of the sleeve projection and the bearing for the carrier element on an outer bearing seat.

An annular space is formed between the hollow motor shaft and the intermediate shaft extending therethrough, through which the lubricant can flow back into the gearing chamber from the remote areas of the shaft bearings for the intermediate shaft and the hollow shaft. The hollow shaft preferably has a first end section with a conical inner face that, starting from an annular opening between the hollow shaft and the intermediate shaft, widens in axial direction. The inner conical configuration of the hollow shaft creates a conveying effect for the lubricant from the opening area into the hollow shaft and within the hollow shaft in the direction of the intermediate wall and/or gearing chamber. This results in an overall lubricant circuit through which all rotating and sealing parts in the electric drive are reliably lubricated and cooled. The conical inner face of the hollow shaft can extend from the annular opening in particular to behind the first shaft bearing. In the further course, the hollow shaft can also have a constant inner diameter up to the opposite end portion where the drive gear is provided.

According to a possible embodiment, the sun gear is inserted with a connecting portion into the hollow shaft and is connected thereto in a rotationally fixed manner via shaft splines. The shaft splines are lubricated by the lubricant flowing therethrough, thus preventing fretting corrosion.

According to an embodiment, the electrical machine includes a stator which is rotationally fixedly connected to the motor-side jacket portion of the intermediate housing part, in particular is in contact with an inner circumferential face of the motor-side jacket portion, and a rotor which is rotationally fixedly connected to the hollow shaft. Because the stator of the electric machine is directly connected to the jacket portion of the intermediate housing part, heat can be dissipated particularly effectively by the electric motor into the jacket portion, which in turn is cooled by the coolant.

The electrical machine can be configured in the form of an asynchronous machine, also called induction machine. An asynchronous machine has the advantage that they are robust and have a simple design and are relatively inexpensive. They can operate at high speeds and high temperatures. The inverter can be switched off at any rotational speed of the electric machine, i.e. at any speed of a vehicle. When the asynchronous machine is switched off, there is no more voltage at the coil, so that a separate switch-off unit like a disconnecting clutch is not necessary. However, it is also possible to use a synchronous machine, i.e. a permanently excited electrical machine, in which case a disconnect clutch is preferably provided in the power path. The maximum torque that can be generated by the electric machine can, for example, be more than 200 Nm, in particular about 250 Nm. The maximum motor speed can, for example, be over 12,000 rpm, in particular over 15,000 rpm.

According to a first embodiment, the power distribution unit can be configured as a differential unit, with the input part connected to the planet carrier configured as a differential cage and the two output parts configured as side shaft gears. The differential unit splits an introduced rotary motion to the two side shaft gears, between which a balancing effect is provided.

According to an alternative second embodiment, the power distribution unit can be configured as a double clutch unit, with the input part connected to the planet carrier being configured as a clutch basket and the two output parts as clutch hubs. With this configuration, the clutches can be operated individually and continuously variable, so that the respective transmittable torque can be adjusted as required. This functionality is also known as active torque distribution or "torque vectoring".

According to an embodiment, the planetary gearing has an overall transmission ratio (i) between 8 and 12, in particular between 9 and 11, i.e. the speed of the planet carrier is ⅛ to 1/12 of the speed of the electric motor.

The planet gears of the planetary gearing can be configured as double planet gears and each have a first planet toothing, which engages the drive gear of the hollow shaft, and a second planet toothing, which engages the ring gear. Preferably, the toothings of the planet gears are each configured as helical toothings, in particular such that the axial forces acting from the sun gear on the first planet toothing and the axial forces acting from the ring gear on the second planet toothing are directed in opposite directions. In this way, friction losses and forces acting on the bearings are low.

According to an embodiment, the ring gear can be connected to the second housing part by means of screws that are screwed axially into the second housing part. To reduce the splashing behavior of the lubricant splashing in the gearing chamber, it is advantageous if the screw heads of the screws lie at least largely, and in particular completely within an envelope of the ring gear.

BRIEF SUMMARY OF THE DRAWINGS

Example embodiments are described below using the drawing figures. Herein.

DESCRIPTION

FIGS. 1 to 6 are described together below. An electric drive arrangement 2 is shown, which can also be briefly described as an electric drive. The electric drive arrangement 2 comprises an electric machine 3, a planetary gearing 4 drivingly connected with the electric machine 3, and a power distribution unit 5 for distributing a rotary motion introduced by the planetary gearing 4 to two output parts 6, 7 of the electric drive arrangement 2. The electric machine 3, the planetary gearing 4, and the power distribution unit 5 are accommodated in a housing assembly 8, which can also be briefly referred to as housing.

The electric machine 3 serves as a drive source for driving a drive axle of a motor vehicle. The electric machine 3 is controlled by means of power electronics, such as a pulse inverter, with integrated electronic control unit (ECU). For power supply, the electric machine 3 is to be connected to a battery (not shown). The electric machine 3 includes a stator 21, which is firmly connected to the housing 8, and a rotor 22, which is firmly connected to a motor shaft 10 for torque transmission. The electric machine 3 is configured as an asynchronous machine, wherein a synchronous machine can also be used.

The motor shaft 10 is configured as a hollow shaft and is mounted by a first and second bearing 11, 12 so to be rotatable about the axis of rotation A in the housing 8 and is drivable by the rotor 9. At its end facing the gearing 4, a drive part 13 is provided, which is connected to the hollow shaft 10 in a rotationally fixed manner via a shaft connection 14 (splines) and which serves to transmit the rotary motion to the planetary gearing 4. The planetary gearing 4 comprises a sun gear 15, which is configured in one piece with the drive part 13, a hollow gear 16, which is rotationally fixedly connected in the housing 8, several planet gears 17 as well as a planet carrier 18, on which the planet gears 17 are rotatably mounted and rotate jointly therewith.

In the present embodiment, it is provided that the planetary gearing 4 has an overall transmission ratio i between 9 and 11, without being restricted thereto. For this, the planet gears 17 are configured as double planet gears and each include a first planet toothing 47 meshing with the sun gear 15, and a second planet toothing 48 meshing with the ring gear 16. The toothings 47, 48 of the planet gears 17 are each configured as helical toothings, so that the axial forces acting from the sun gear 15 on the first planet toothing 47 and the axial forces acting from the ring gear 16 on the second planet toothing 48 are directed in opposite directions.

The ring gear 16 is connected to a housing part 32 of housing 8 by screws 49, which are screwed axially into the housing part 32. The ring gear 16 has recesses in the area of the screw heads, so that the screw heads are approximately flush with a side wall of the ring gear 16 when mounted. This prevents splash losses due to turbulence in the area of the screw heads.

The planet carrier 18 is firmly connected to the input part 19 of the power distribution unit 5, so that both jointly rotate around the axis of rotation A. The power distribution unit 5 is configured as a differential gearing, including a differential cage as input part 19, several differential gears 20 rotating jointly with the differential cage 19, and two side shaft gears as output parts 6, 7 meshing with the differential gears 20. The differential unit 5 divides an introduced rotational movement to the two side shaft gears 6, 7, wherein a balancing effect is effective therebetween. The planetary carrier 18 and the differential cage 19, which can also be called differential carrier, are configured in one piece in the present case, wherein the component thus formed is also jointly referred to as carrier element 50.

An intermediate shaft 23 is connected to one (6) of the two side shaft gears 6, 7 so as to transmit torque to a side shaft (not shown) to be connected at the other end. The intermediate shaft 23 extends through the hollow shaft 10, wherein an annular space 24 with two end openings is formed between the two. A second side shaft (not shown) is to be connected to the second side shaft gear 7 for transmitting torque to an associated second vehicle wheel. For lubricating the rotating and sealing parts, a lubricant 25 is provided for the gearing unit comprising the planetary gearing and the differential gearing.

The present electric drive arrangement 2 has a special configuration with regard to cooling and lubrication, which is explained in greater detail below.

The housing assembly 8 of the electric drive 2 comprises a first housing part 31, which forms a receiving space for the electric machine 3, a second housing part 32, in which the gearing unit 4, 5 is at least partially received, and an intermediate housing part 33, which is arranged between the two end-sided housing parts 31, 32. It can be seen in particular in FIG. 1 that the intermediate housing part 33 has an intermediate wall 34 which spatially separates a motor chamber 35 and a gearing chamber 36. The motor chamber 35 is dry, i.e. free of lubricant, and sealed to the outside by appropriate seals 26, 27, 28, 29, while the gearing chamber 36 is filled with lubricant 25.

Figure 1:
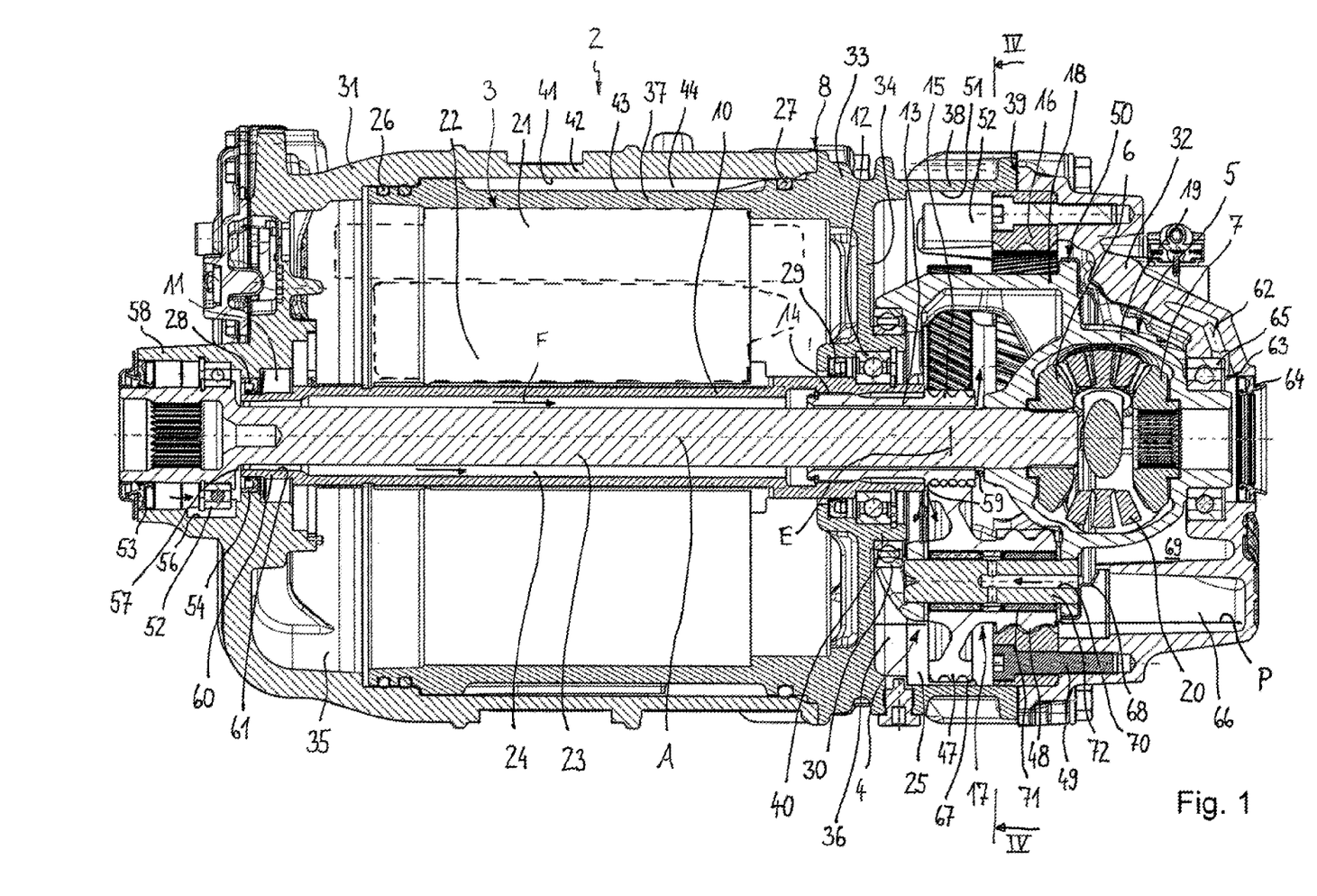
FIG. 1 shows a longitudinal section of an electric drive arrangement.
Figure 2:
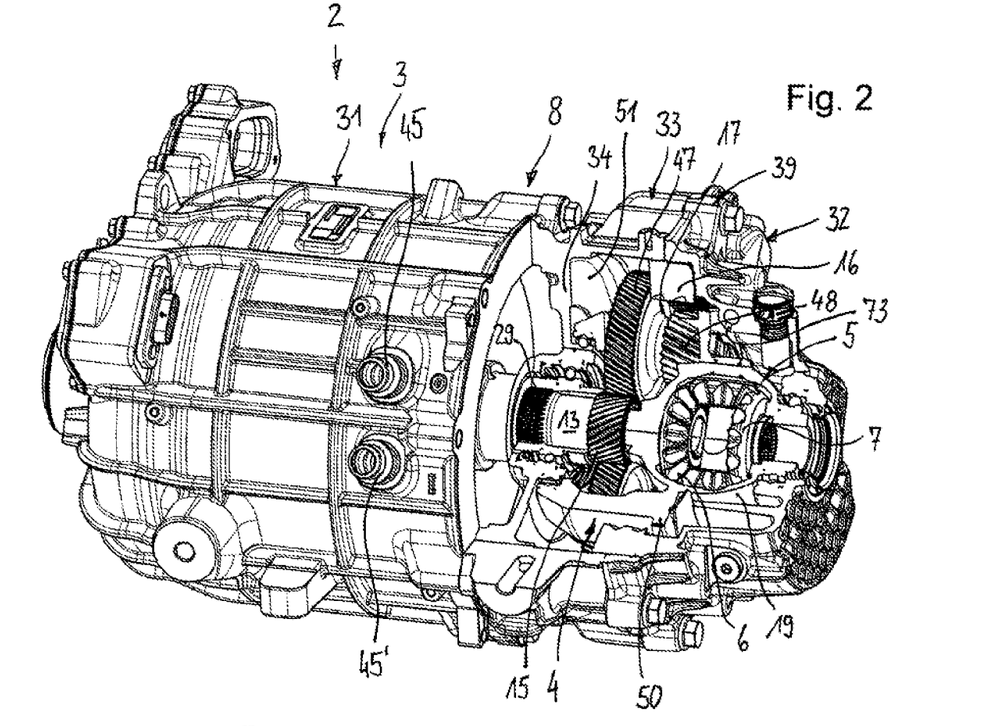
FIG. 2 shows the electric drive arrangement of FIG. 1 in perspective view from diagonally in front, partially cut.
Figure 3:
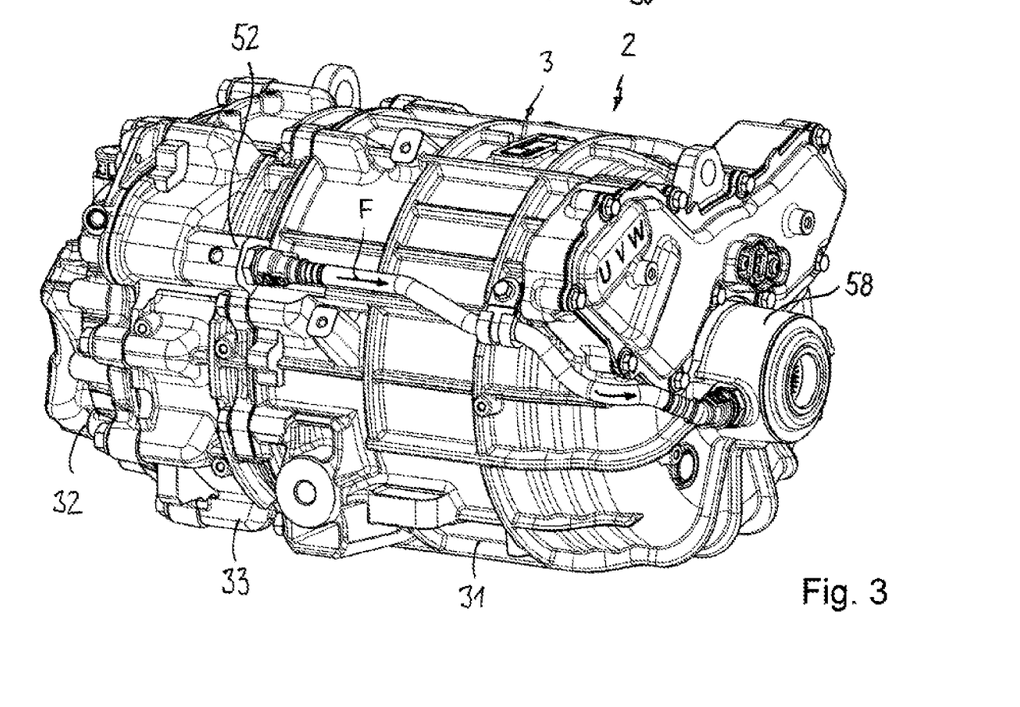
FIG. 3 shows the electric drive arrangement of FIG. 1 in perspective view from diagonally behind.
Figure 4:
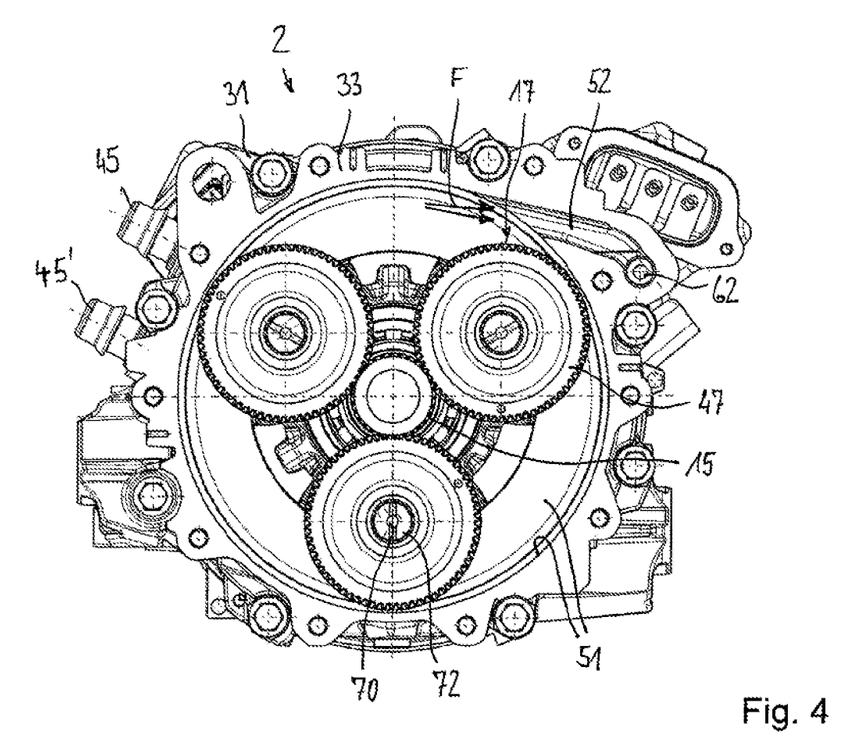
FIG. 4 shows the electric drive arrangement of FIG. 1 in cross-section according to section line IV-IV from FIG. 1.
Figure 5:
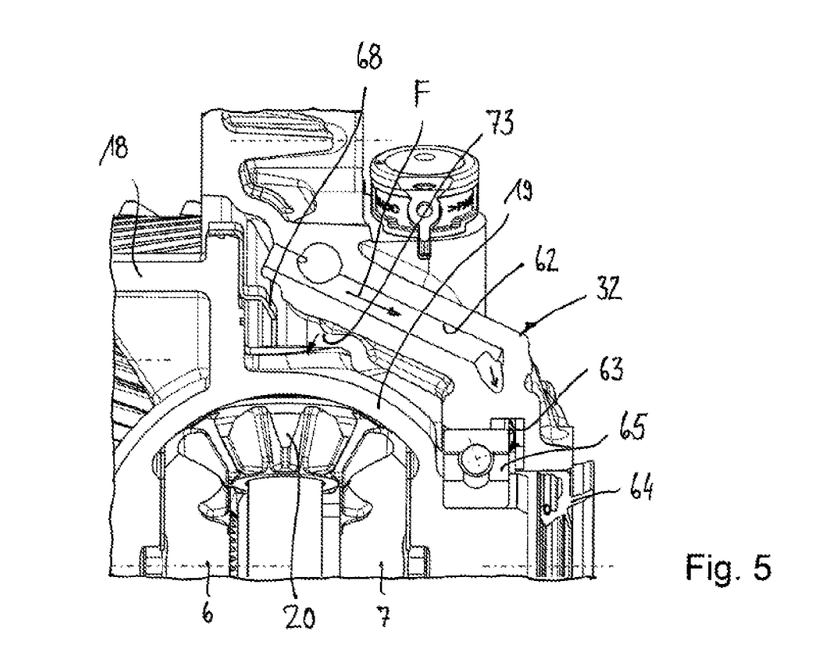
FIG. 5 shows a detail of the lubricant supply of the electric drive arrangement of FIG. 1 in enlarged sectional view.
Figure 6:
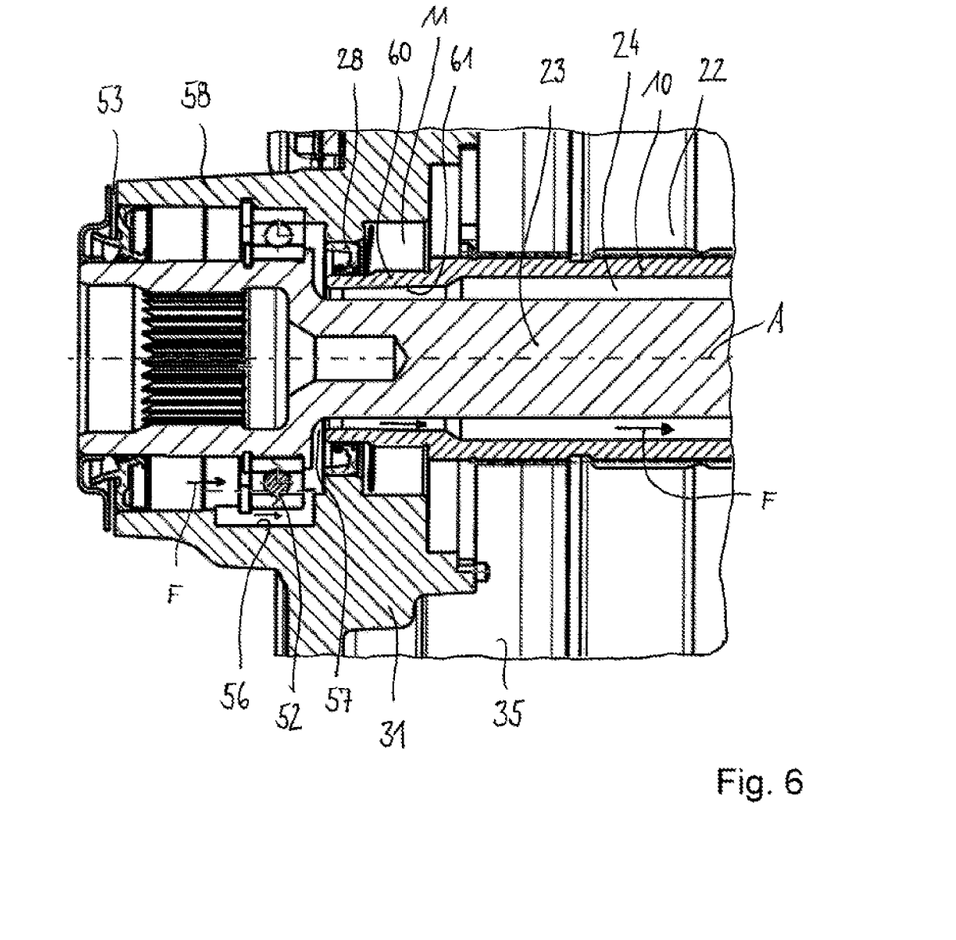
FIG. 6 shows another detail of the lubricant supply of the electric drive arrangement of FIG. 1 in enlarged sectional view.

The intermediate housing part 33 comprises a jacket portion 37 on the motor side, which extends axially from the intermediate wall 34 into the first housing part 31, and a jacket portion 38 on the gearing side, which extends axially from the intermediate wall 34 in the direction of the second housing part 32 and is connected therewith via flange connections 39. The motor-side jacket portion 37, the intermediate wall 34 and the gearing-side jacket portion 38 are configured in one piece, so that these portions are in thermal contact with each other. Between the inner face 41 of the outer jacket portion 42 and the outer face 43 of the motor-side jacket portion 37, a sealed, circumferential cavity 44 is formed for a coolant flowing therethrough. The cavity 44 formed between the outer jacket 42 and the inner jacket 37 can have a path structure that increases the surface area, for example a meandering structure, so that a large amount of heat from the jacket portions 42, 37 can be absorbed and removed by the coolant flowing therethrough. A standard coolant, such as a water-glycol mixture, can be used to cool the jacket 27, 42. FIG. 2 shows the two connectors 45, 45' through which the coolant flows into and out of the jacket.

The intermediate housing part 33 is configured in particular such that its inner surface 51, which delimits the gearing chamber 36 and comes into contact with the lubricant splashing around therein during operation, accounts for at least 30% of the total inner surface of the gearing chamber 36, preferably at least 40% of the surface. It can be seen in particular in FIG. 1 that the gearing-side jacket portion 38 of the housing part 33 extends axially beyond the toothing plane E, in which the sun gear 15 is in meshing engagement with the planet gears 17. The axial length of the gearing-side jacket portion 38 can be, for example, at least 0.15 times, in particular at least 0.2 times, the axial length of the motor-side jacket portion 37. In this way, the gearing-side jacket portion projects particularly far over the planet carrier 18 so that a great amount of heat can be absorbed by the lubricant 25 coming into contact therewith via the inner surface 51 and dissipated to the motor coolant via the motor-side jacket portion 37.

The intermediate housing part 33 has an oil collecting chamber 52 in an upper half of the housing, in which coolant 25, splashing around from the planet carrier 18 and the planet gears 17 respectively, can be temporarily retained. The oil collecting chamber 52 is arranged axially overlapping the planet gears 17 so that preferably much lubricant enters the chamber 52 upon rotation of the planet carrier 18. The flow direction F of the lubricant is indicated in the figures by arrows, with only some of the arrows being exemplary provided with reference sign F.

A passive lubricant supply of the remote rotating bearings and seals is provided. To supply lubricant to the bearings 46 and seals 53, 54 located at the motor-side end of the electric drive 2, a lubricant line 55 is provided from the oil collecting chamber 52 to a bottom-side sleeve projection 58 of the first housing part 31. As can be seen in particular in FIG. 3, the lubricant line 55 is routed outside the housing 8 to the sleeve projection 58. The end associated with the oil collecting chamber 52 is at a higher level than the end of the line 55 associated with the sleeve projection 58, so that the lubricant 25 can flow by gravity from the oil collecting chamber 52 to the remote opening in the sleeve projection 58. The opening of the lubricant line 55 is located between the shaft seal 53 and the shaft bearing 52. From here, the lubricant 25 flows through a passage opening 56 below the bearing 52 into the opening area 57 between the hollow shaft 10 and the intermediate shaft 23.

From the opening 57, the lubricant 25 enters the annular space 24 and flows to the other end of the hollow shaft 10, which is supported in the intermediate wall 34, where it exits in the gearing chamber 36. As can be seen in particular in FIG. 6, the hollow shaft 10 has a tapered inner face 61 at its end section 60, which widens in the axial direction from an annular opening 57 between the hollow shaft 10 and the intermediate shaft 23. The tapered inner surface 61 of the hollow shaft 10 has a conveying effect for the lubricant 25 from the opening area 57 into the hollow shaft and within the hollow shaft towards the gearing chamber 36. At least partial quantities of the lubricant 25 pass through the shaft splines 14 between the hollow shaft 10 and the drive part 13, so that these are lubricated and fretting corrosion is prevented. At the gearing-side opening 59 of the hollow shaft 10, the lubricant returns into the gearing chamber 36, so that a passive lubricant circuit is created, through which all rotating and sealing parts in the electric drive 2 are reliably lubricated and cooled.

A fluid channel 62 is provided for the lubrication of the remote parts of the gearing unit, which fluidically connects the oil collecting chamber 52 with a bearing and sealing portion of the second housing part 32. The mouth 63 of the fluid channel 62 is located axially between the bearing 64 of the carrier element 19 and the shaft seal 65.

An intermediate chamber 66 is provided in a lower half of the second housing part 32, in which 2 lubricant 25 is retained during operation of the electric drive. The intermediate chamber 66 is located above a deepest sump 67 of the gearing chamber 36. The chamber 66 provides an additional volume for the lubricant during operation, so that the dynamic lubricant level is low and splash losses are kept low. The lubricant volume is small and, in particular, is dimensioned so that the dynamic lubricant level P is below the bearings 71 of the planet gears 17, preferably approximately in the area of meshing engagement of the smaller gear portions 48 with the ring gear 16. In this way, the temperature of the lubricant sump is kept low. The lubricant may have a low viscosity of, for example, less than 10 mm$^2$/s, in particular less than 8 mm$^2$/s at 100° C. This contributes advantageously to low splash losses.

Furthermore, a baffle plate 68 is provided on the carrier element 50 so that lubricant 25 can pass from chamber 69 into lubrication channels 70 for the bearing locations 71 of the planet gears 17, which are rotatably mounted on journals 72 fixed in the carrier element 50. To lubricate the gears 20, 21 arranged within the differential cage 19, the gearing housing 32 above the carrier element 50 has a drip geometry 73 from which lubricant can drip into circumferentially distributed openings of the differential carrier 19.

The intermediate plate 37 has bearing locations for the support element 50 and the hollow shaft 10. In particular, the intermediate plate 37 has a sleeve portion 40 at a radially inner end, wherein the shaft bearing 12 for the hollow shaft 10 is arranged in an inner bearing seat and the bearing 30 for the support element 50 is arranged on an outer bearing seat of the sleeve portion 40. The carrier element bearing 30 and the shaft bearing 12 have a partial axial overlap, resulting in a compact axial size.

Overall, the electric drive 2 has a compact design due to the coaxial arrangement of the electric motor 3 and the gearing unit 4, 5. The configuration of the housing 8, in which the intermediate housing part 33 forms a thermal bridge between the gearing unit 4, 5 and the motor unit, ensures efficient heat dissipation and thus a long service life of the electric drive. Only the described stator cooling of the electric motor 3 is necessary as the only heat exchanger for the gearing. There is no need for an active cooling and/or lubrication with an externally driven pump. This design even allows the use of an inductive electric machine, which generates higher losses than a synchronous machine.

LIST OF REFERENCE SIGNS 2 electric drive arrangement
3 electric machine
4 planetary gearing
5 power distribution unit
6 output part
7 output part
8 housing assembly
10 motor shaft
11, 12 bearing
13 drive part
14 shaft connection
15 sun gear
16 ring gear
17 planet gear
18 planet carrier
19 input part/differential carrier
20 differential gears
21 stator
22 rotor
23 intermediate shaft
24 annular space
25 lubricant
26-29 seal
30 bearing
31 first housing part
32 second housing part
33 intermediate housing part
34 intermediate wall
35 motor chamber
36 gearing chamber
37 first jacket portion (33)
38 second jacket portion (33)
39 flange connection
40 sleeve portion
41 inner face
42 jacket portion (31)
43 outer face
44 cavity
45, 45' connectors
46 bearing
47, 48 planet toothing
49 screw
50 support element
51 surface (33)
52 oil collecting chamber
53, 54 seal
55 lubricant line
56 passage opening
57 opening area
58 sleeve projection
59 opening
60 end portion
61 inner face
62 fluid channel
63 opening
64 bearing
65 shaft seal
66 intermediate chamber
67 sump
68 baffle plate
69 chamber
70 lubrication channel
71 bearing location
72 journal
73 drip geometry
A axis of rotation
E plane
F flow direction
P dynamic lubricant level
i transmission ratio

The invention claimed is:

1. An electric drive for driving a motor vehicle, comprising:
a housing assembly;
an electric machine with a motor shaft in the form of a hollow shaft which is rotatably drivable about an axis of rotation by the electric machine;
a planetary gearing with a sun gear, a ring gear, a plurality of planet gears and a planet carrier, wherein the sun gear is rotatably drivable about the axis of rotation by the hollow shaft, and the ring gear is arranged in the housing assembly in a rotationally fixed manner; and
a power distribution unit with an input part and two output parts;

wherein the input part is connected to the planet carrier and rotates together therewith about the axis of rotation;

wherein one of the two output parts is connected to an intermediate shaft extending through the hollow shaft of the electric machine;

wherein the housing assembly comprises a first housing part motor sided, a second housing part gearing sided, and an intermediate housing part arranged between the first housing part and the second housing part, wherein the intermediate housing part comprises an intermediate wall which spatially separates a motor chamber and a gearing chamber, wherein a lubricant is contained in the gearing chamber;

wherein the intermediate housing part, integrally formed with the intermediate wall, comprises a motor-side jacket portion which extends from the intermediate wall axially into the outer jacket portion of the first housing part, and a gearing-side jacket portion which extends from the intermediate wall axially in a direction of the second housing part and is at least indirectly connected therewith, wherein the gearing-side jacket portion of the intermediate housing part extends axially beyond an engagement plane in which the sun gear is in toothed engagement with the planet gears; and wherein a sealed cavity for a through-flowing coolant is formed between an outer face of the motor-side jacket portion and an inner face of the first housing part.

2. The electric drive of claim 1,
wherein in the gearing chamber an inner surface of the intermediate housing part forms at least 30% of a total inner surface of the housing portion enclosing the gearing chamber.

3. The electric drive of claim 1,
wherein the axial length of the gearing-side jacket portion is at least 0.15 times an axial length of the motor-side jacket portion.

4. The electric drive of claim 1,
wherein the intermediate housing part has, in an upper half of the housing assembly, an oil-collecting chamber which is at least partially in axial overlap with the planet gears, and wherein coolant splashing around from the planet gears during rotation of the planet carrier is temporarily stored in the oil-collecting chamber.

5. The electric drive of claim 1,
wherein the second housing part has, in a lower housing half, an intermediate chamber which is located above a sump of the gearing chamber, wherein lubricant is temporarily stored in the intermediate chamber during operation of the electric drive.

6. The electric drive of claim 1,
wherein the planet carrier and the input part of the power distribution unit are fixedly connected to each other and form a carrier element, wherein a first end of the carrier element is rotatably mounted at the intermediate housing part by a first carrier bearing, and a second end of the carrier element is rotatably mounted at the second housing part by a second carrier bearing;

wherein a gearing side fluid channel is provided, which fluidically connects an oil collecting chamber with the second carrier bearing.

7. The electric drive of claim 6,
wherein the intermediate plate includes a sleeve portion with an inner bearing seat for a shaft bearing of the hollow shaft and with an outer bearing seat for the first carrier bearing of the carrier element, wherein the shaft bearing of the hollow shaft and the first carrier bearing of the carrier element at least partially overlap each other axially.

8. The electric drive of claim 1,
wherein the intermediate shaft is rotatably supported by a bearing in a sleeve projection of the first housing part,
wherein a motor-side fluid channel is provided, which fluidically connects an oil collecting chamber with the sleeve projection of the first housing part for lubricating the bearing.

9. The electric drive of claim 1,
wherein the electrical machine comprises a stator which is connected in a rotationally fixed manner to the motor-side jacket portion of the intermediate housing part, and a rotor which is connected in a rotationally fixed manner to the hollow shaft.

10. The electric drive of claim 1,
wherein the electric machine is configured in the form of an asynchronous machine.

11. The electric drive of claim 1,
wherein the hollow shaft has a first end portion with a conical inner face which widens in the axial direction from an annular opening between the hollow shaft and the intermediate shaft,
wherein the conical inner face extends from the annular opening to behind the first shaft bearing.

12. The electric drive of claim 1,
wherein the sun gear has a connecting portion which is inserted into the hollow shaft and is connected therewith in a rotationally fixed manner by shaft splines, wherein the shaft splines are lubricated by the lubricant flowing therethrough.

13. The electric drive of claim 1,
wherein the power distribution unit is configured as a differential gearing, wherein the input part connected to the planet carrier is configured as a differential cage and the two output parts are configured as side shaft gears.

14. The electric drive of claim 1,
wherein the planet gears of the planetary gearing are configured as double planet gears and each have a first planet toothing engaging with the sun gear and a second planet toothing engaging with the ring gear,
wherein the first planet toothing and the second planet toothing are each configured as helical toothing such that axial forces acting from the sun gear on the first planet toothing, and axial forces acting from the ring gear on the second planet toothing, are directed in opposite directions.

15. The electric drive of claim 1,
wherein the ring gear is connected to the second housing part by screws which are screwed axially into the second housing part, wherein the screw heads of the screws are arranged at least mostly within an axial extension of the ring gear.

16. An electric drive for driving a motor vehicle, comprising:
a housing assembly;
an electric machine with a motor shaft in the form of a hollow shaft which is rotatably drivable about an axis of rotation by the electric machine;
a planetary gearing with a sun gear, a ring gear, a plurality of planet gears and a planet carrier, wherein the sun gear is rotatably drivable about the axis of rotation by the hollow shaft, and the ring gear is arranged in the housing assembly in a rotationally fixed manner; and
a power distribution unit with an input part and two output parts;

wherein the input part is connected to the planet carrier and rotates together therewith about the axis of rotation;

wherein one of the two output parts is connected to an intermediate shaft extending through the hollow shaft of the electric machine;

wherein the housing assembly comprises a first housing part motor sided, a second housing part gearing sided, and an intermediate housing part arranged between the first housing part and the second housing part, wherein the intermediate housing part comprises an intermediate wall which spatially separates a motor chamber and a gearing chamber, wherein a lubricant is contained in the gearing chamber;

wherein the intermediate housing part, integrally formed with the intermediate wall, comprises a motor-side jacket portion which extends from the intermediate wall axially into the outer jacket portion of the first housing part, and a gearing-side jacket portion which extends from the intermediate wall axially in a direction of the second housing part and is at least indirectly connected therewith;

wherein a sealed cavity for a through-flowing coolant is formed between an outer face of the motor-side jacket portion and an inner face of the first housing part; and wherein the intermediate housing part has, in an upper half of the housing assembly, an oil-collecting chamber which is at least partially in axial overlap with the planet gears, and wherein coolant splashing around from the planet gears during rotation of the planet carrier is temporarily stored in the oil-collecting chamber.

17. An electric drive for driving a motor vehicle, comprising:

a housing assembly;

an electric machine with a motor shaft in the form of a hollow shaft which is rotatably drivable about an axis of rotation by the electric machine;

a planetary gearing with a sun gear, a ring gear, a plurality of planet gears and a planet carrier, wherein the sun gear is rotatably drivable about the axis of rotation by the hollow shaft, and the ring gear is arranged in the housing assembly in a rotationally fixed manner; and a power distribution unit with an input part and two output parts;

wherein the input part is connected to the planet carrier and rotates together therewith about the axis of rotation;

wherein one of the two output parts is connected to an intermediate shaft extending through the hollow shaft of the electric machine;

wherein the housing assembly comprises a first housing part motor sided, a second housing part gearing sided, and an intermediate housing part arranged between the first housing part and the second housing part, wherein the intermediate housing part comprises an intermediate wall which spatially separates a motor chamber and a gearing chamber, wherein a lubricant is contained in the gearing chamber;

wherein the intermediate housing part, integrally formed with the intermediate wall, comprises a motor-side jacket portion which extends from the intermediate wall axially into the outer jacket portion of the first housing part, and a gearing-side jacket portion which extends from the intermediate wall axially in a direction of the second housing part and is at least indirectly connected therewith;

wherein a sealed cavity for a through-flowing coolant is formed between an outer face of the motor-side jacket portion and an inner face of the first housing part;

wherein the planet carrier and the input part of the power distribution unit are fixedly connected to each other and form a carrier element, wherein a first end of the carrier element is rotatably mounted at the intermediate housing part by a first carrier bearing, and a second end of the carrier element is rotatably mounted at the second housing part by a second carrier bearing; and wherein a gearing side fluid channel is provided, which fluidically connects the oil collecting chamber with the second carrier bearing.

\* \* \* \* \*